Aug. 25, 1970            L. B. TAPLIN            3,525,488
APPARATUS FOR TRANSFORMING ROTATIONAL RATES INTO FLUID SIGNALS
Filed May 4, 1966            2 Sheets-Sheet 2
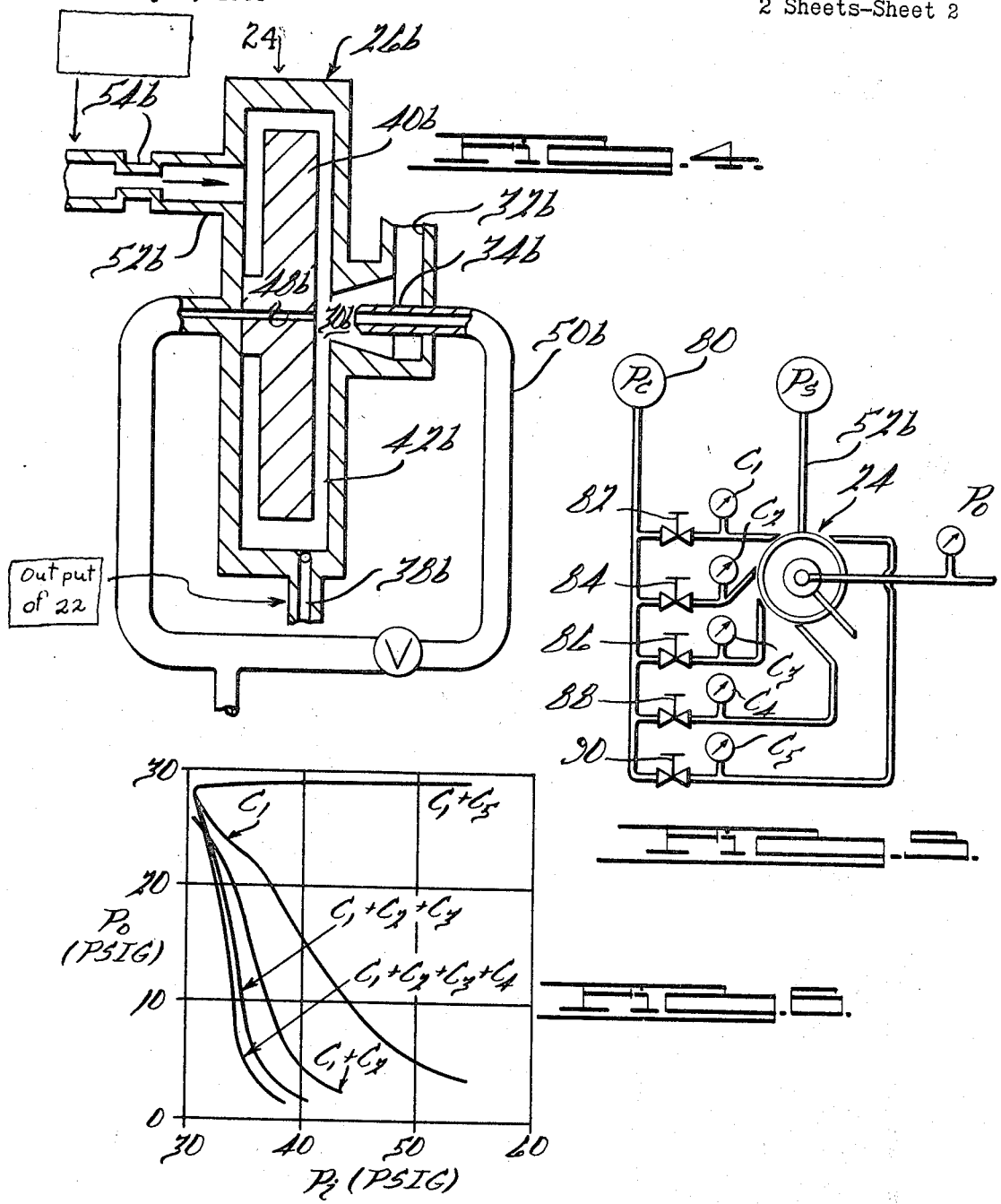
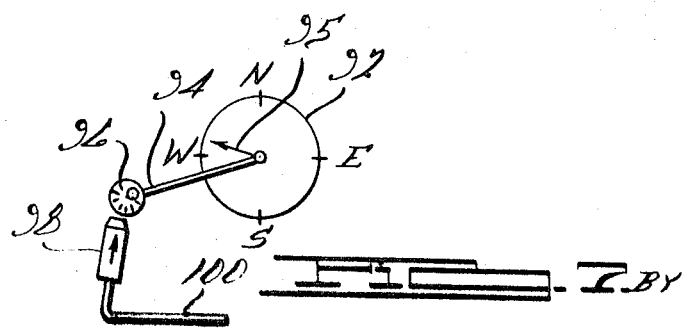
INVENTOR
Lael B. Taplin
BY
Richard T. Seeger
ATTORNEY.

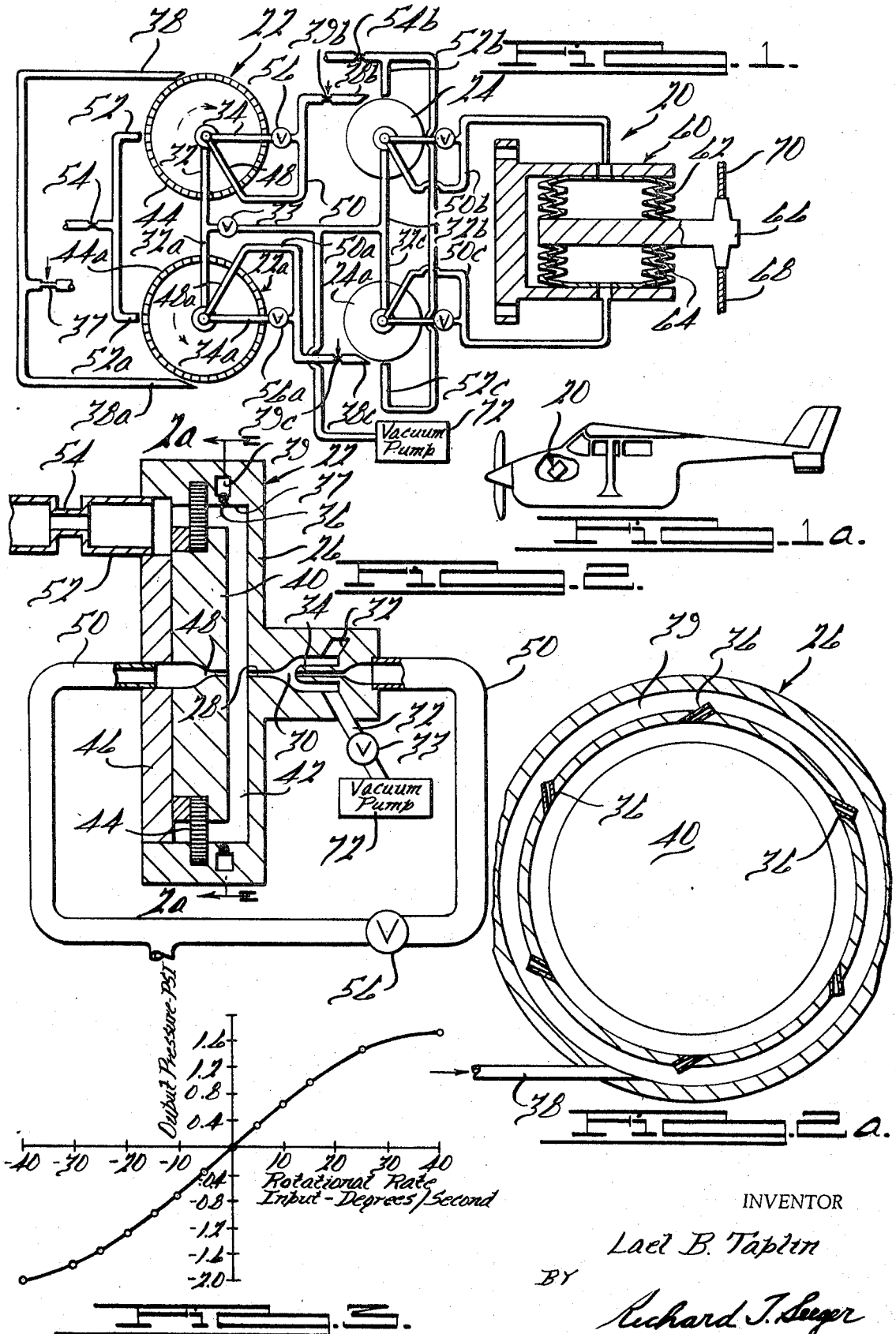

United States Patent Office 3,525,488
Patented Aug. 25, 1970

3,525,488
APPARATUS FOR TRANSFORMING ROTATIONAL
RATES INTO FLUID SIGNALS
Lael B. Taplin, Livonia, Mich., assignor to The Bendix
Corporation, a corporation of Delaware
Filed May 4, 1966, Ser. No. 547,595
Int. Cl. F15c 1/16; B64c 13/36, 13/40
U.S. Cl. 244—78                                16 Claims

ABSTRACT OF THE DISCLOSURE

Apparatus for transforming rotational rates into fluid signals which actuate a fluid control device to maintain the wings of an aircraft level in flight. A pair of vortex rate sensors having parallel axes and a common supply are connected to the fluid control device so that the outputs from the sensors actuate the control device. Each rate sensor has a biasing vortical flow in a direction opposite to the other sensor such that a rotation imparted to the pair by wing movement will reinforce the vortical flow in one and subtract from the vortical flow in the other to provide a constant combined demand upon the supply and a difference in outputs which is used to actuate the control device.

This invention pertains to fluid apparatus for transforming rotational rates into fluid signals and more particularly to apparatus for sensing rotational rates of aircraft, which indicate change in the attitude and direction of the aircraft to provide a correction signal to the controls of the aircraft to reestablish the original attitude and direction of the aircraft.

It is an object of this invention to provide a relatively simple, inexpensive, flight control automatic pilot system for aircraft which does not require expensive gyros. This object is accomplished by providing fluid rotational rate sensor apparatus using a fluid vortex device as disclosed and described in copending application to Endre A. Mayer, Ser. No. 458,619, filed May 25, 1965, entitled "Fluid Device." The output of the fluid rate sensor apparatus is amplified and then utilized to operate the aircraft controls.

It is a further object of this invention to provide a simple, inexpensive, flight control for aircraft which does not require a pressure regulator for the fluid system. This object is accomplished in the preferred embodiment by utilizing two vortex rate sensors with a common input passage for both, providing means for biasing one of the vortex rate sensors with a vortical flow in one direction and biasing the other of the vortex rate sensors with a vortical flow in the opposite direction so that for a given rotation of the aircraft, the imparted rotation to one sensor will reinforce the biasing flow while the imparted rotation to the other sensor will subtract from the biasing flow. In this manner, as the output pressure of one sensor drops, the output pressure of the other sensor will increase making the fluid demand from the common supply passage substantially constant, thereby making a regulated fluid supply unnecessary.

It is an object of this invention to amplify each of the vortex rotational rate sensors of the previous objects with additional vortex fluid devices and then utilizing the amplified signal to operate the control of an aircraft or other device. It is an additional object of this invention to utilize additional tangential vortex producing control systems, which are generated by instruments such as magnetic compass, preset heading, altimeter, glide scope and track and capture, to accordingly modify the output of the vortex amplifier.

These and other objects will become more apparent when preferred embodiments of this invention are considered in connection with the drawings in which:

FIG. 1 is a diagrammatic schematic view of a fluid control system of this invention;

FIG. 1a is a diagrammatic view of a control system placed in an aircraft;

FIG. 2 is a diagrammatic sectional view of the rotational rate sensors utilized in a preferred embodiment of this invention;

FIG. 2a is a section taken at 2a—2a of FIG. 2 showing the tangential control jets;

FIG. 3 is a graph showing typical output characteristics of the sensor;

FIG. 4 is a diagrammatic sectional view of a vortex amplifier used in a preferred embodiment of this invention;

FIG. 5 is a diagrammatic schematic of a vortex amplifier having a plurality of control inputs, each of which modifies the amplifier output;

FIG. 6 is a graph showing a typical characteristic curve of the device of FIG. 5 showing the influence of the additional control streams on the output; and FIG. 7 is a diagrammatic view of an instrument, such as a compass, and means for generating a pressure which is proportional to the heading of the magnetic compass.

FIG. 1 is a schematic diagram showing fluid system 20 for an aircraft that can automatically hold the wings level in aircraft flight when the sensitive axis of the rate sensor is oriented to sense combined vehicle yaw and roll rate. A rotational rate sensor 22 is shown in more detail in FIG. 2 and a vortex fluid amplifier 24 is shown in more detail in FIG. 4. Before describing the schematic of FIG. 1, the rate sensor in FIG. 2 and the amplifier in FIG. 4 will be described.

RATE SENSOR 22 (FIG. 2)

In the schematic of FIG. 2 is shown a cup shaped housing 26 having a chamber outlet 28 formed centrally thereof. The outlet 28 is connected to vacuum chamber 30 which has connected thereto a plurality of vacuum vents 32 which are connected to vacuum pump 72 through valve 33. Located centrally of vacuum chamber 30 and axially aligned with chamber outlet passage 28 is external pickoff tube 34. Also formed in housing 26 circumferentially thereof are a plurality of nozzles 36 which direct fluid tangentially into the interior of housing 26 along inner circumference 37 thereby creating a vortical flow. A control inlet 38 (FIG. 2a) is also formed in housing 26 and supplies fluid to nozzles 36 through annulus 39.

A button 40 is supported centrally in housing 26 and is spaced therefrom to form vortex chamber 42. A porous annulus 44 is formed between the outer circumference of button 40 and circumference 37 and aids in the rate sensing capabilities. A cover 46 is attached to and supports button 40 and is connected to housing 26.

An internal pickoff passage 48 is formed centrally in button 40 and communicates through fluid line 50 to external pickoff tube 34. Supply inlet 52 is formed through cover 46 and provides an entrance for supply fluid which flows through restricted orifice 54.

Frequently a supply pressure greater than atmospheric pressure is applied to inlet 52; however, in this embodiment, the same effect is obtained by drawing a vacuum on vacuum vents 32 by means of vacuum pump 72 which will cause a flow through orifice 54, and control inlet 38 due to atmospheric pressure outside of sensor 22. A pressure drop occurs across orifice 54, and therefore the supply pressure $P_S$ in supply inlet 52 is less than the control pressure $P_C$ which is in inlet tube 38. This causes a constant "bias" swirl in vortex chamber 42 and this bias swirl centers the operation of the device in the maximum gain portion of its input-output curve.

The flow from chamber 42 passes into vacuum chamber 30 through output passage 28 and then through vacuum vent 32. Valve 33 may be used to adjust the pressure in chamber 32. A fluid flow which is counter to that in passage 28 is developed in external pickoff tube 34 due to the higher pressures in internal pickoff passage 48. A valve 56 is located in line 50 and may be adjusted to achieve desired gain and noise characteristics.

As sensor 22 is rotated, as would be the case if it were fixed on a rotation axis in an aircraft and the aircraft rotated about the axis, a swirl of air is induced in chamber 42 causing the output pressure $P_O$ in the tube 34 to either increase or decrease, according to the direction of the rotation. Porous coupling element 44 aids in the swirling of air in chamber 42 when the sensor 22 is rotated. The curve shown in FIG. 3 plots Rotational Rate Input vs. Pressure Output and was obtained for a device similar to that shown in FIG. 2 and described above. Sensor 22a is essentially identical to sensor 22 except the biasing vortical flow is in the opposite direction.

AMPLIFIER 24 (FIGURE 4)

The amplifiers 24, 24a are similar in construction to the sensor in FIG. 2 and only amplifier 24 is shown in FIG. 4. Parts in amplifiers 24, 24a, which are similar to parts in sensor 22 carry similar reference numerals and are suffixed by the letters "b" and "c" respectively. The amplifier in FIG. 4 has its control port 38b connected to the output of rate sensor 22. Further, amplifiers 24, 24a do not have a porous coupling element 44.

The operation of amplifier 24 is similar to the operation of sensor 22 with the major difference being in the manner of obtaining control vortical flow in chambers 42b, 42 respectively. In sensor 22, the control vortical flow is obtained by rotating the sensor while in amplifier 24, the control vortical flow is obtained from the fluid output of sensor 22.

EMBODIMENT OF FIGURE 1

In the schematic of FIG. 1, rate sensors 22, 22a are mounted so that their axes of the vortex chambers are aligned with the axis of the vehicle such as an aircraft about which the rotation is to be sensed. The output of rotational rate sensor 22 is connected to tangential control port 38b of amplifier 24 and the output of rotational rate sensor 22a is connected to tangential control port 38c of amplifier 24a. Variable orifices 39b and 39c may be used to control the overall system gain. Also, several additional amplifiers may be connected in series to each of amplifiers 24, 24a to increase overall gain.

The output of amplifier 24 is connected to an upper bellows chamber 62 of a pneumatic control 60 while the output of amplifier 24a is connected to a lower bellows chamber 64 of pneumatic control device 60. Between bellows chamber 62, 64 is control arm 66 which has control cables 68, 70 connected thereto and movable thereby. As will be seen, when an increased pressure is applied to bellows chamber 62, a corresponding reduced pressure will be applied to bellows chamber 64 thereby moving arm 66 in a downward direction and causing control cables 68, 70 to be correspondingly moved. Likewise, when an increased pressure is applied to chamber 64 by amplifier 24a, a corresponding reduced pressure will be applied to bellows chamber 62 by amplifier 24 thereby moving control arm 66 and control cables 68, 70 in an upward direction.

Under quiescent conditions, the outputs of rate sensors 22, 22a will have an output signal that will bias the quiescent operating position of amplifiers 24, 24a respectively to approximately the mid point of the high gain section of their input-output curve. Therefore, there will be an output pressure delivered by amplifiers 24, 24a to bellows 62, 64 respectively under quiescent, or no signal, conditions which pressure will balance arm 66 in a neutral position.

Vacuum pump 72 is connected to vacuum chamber vents 32, 32a, 32b, 32c and provides the operating pressures for the rate sensors 22, 22a and amplifiers 24, 24a.

Orifice 54b restricts the supply lines 52b, 52c of amplifiers 24, 24a thereby reducing the pressure in lines 52b, 52c to a value less than that in lines 38b, 38c to provide the desired control bias.

With orifice 54 reducing the pressure in lines 52 and 52a below the control line pressures 38, 38a, the fluid devices 22, 22a are properly biased for no signal mid point operation on the high gain portion of their curves. In this preferred embodiment, rate sensors 22, 22a are coaxial, in fixed relation to each other and to the vehicle in which they are mounted. The biasing ports 38 are directed so that a clockwise vortical flow occurs in sensor 22 and the biasing ports 38a are directed so that a counter clockwise vortical flow occurs in sensor 22a under no signal conditions. Hence, any rotation of the vhicle about the axis of sensors 22, 22a will reinforce the vortical flow in one of the sensors and diminish the vortical flow in the other of the sensors therby respectively decreasing the output pressure in one of the sensors and increasing the output pressure in the other of the sensors so that the total of the output pressures of both sensors remains approximately the same during all operating conditions. This means that the fluid demand through orifice 54, which is connected to atmosphere, will remain substantially constant and therefore a pressure regulator and a pressure regulator system is unnecessary, further reducing the costs and further simplifying this system. Without the dual sensors having opposite vortical flows, pressure regulation would be necessary since a change in output pressure would otherwise change supply pressure which would alter the relationship between the bias pressure control and thereby alter the bias flow.

To obtain maximum gain in the rate sensors 22, 22a and amplifiers 24, 24a, the external pickoffs 34 to 34c are connected, respectively, to the internal pickoffs 48 to 48c. However, the external pickoffs may be used in isolated circuits as described in copending Mayer application.

Also, multiple stages may be used in both the sensors 22, 22a and the amplifiers 24, 24a. This cascading of stages would increase the sensing and amplification to levels desired for particular applications.

While sensors 22, 22a have been described as correct aircraft attitude and direction errors, they may also be used to receive a command signal from the pilot to effect a change in aircraft position. This may be accomplished by introducing pilot controlled pressure changes to fluid control supply 37 to change the pressure in either or both of chambers 62, 64, moving control 66. Preferably, for a given command signal, the signals to tubes 38, 38a are equal in magnitude but opposite in direction, thereby making a pressure regulation unnecessary.

EMBODIMENT OF FIGURE 5

If desired, additional inputs may be made to the amplifiers 24, 24a for adding to or subtracting from the control inputs signals in lines 38b, 38c. This is shown in the schematic of FIG. 5 where amplifier 24 is shown schematically and supply presure $P_S$ is shown at line 52b. Five separate inputs C–1 to C–5 are shown connected tangentially to the outer circumference of amplifier 24. A control pressure source $P_C$ shown at 80 is fed through pressure modifying devices 82 to 90 which may add to or subtract from the signal going to vehicle control 60. The graph of FIG. 6 shows the output pressure plotted against the input pressure for various combinations of control pressures C–1 to C–5.

The fluid pressure control devices 82 to 90 may include a magnetic compass control, an adjustable heading card control for providing a pilot with a preselected heading hold set point which may be changed during flight, VOR navigation devices for cross country flying and landing approaches with a VOR track added by means of a pneumatic interface with an OMNI coupler, an altimeter for altimeter hold function and a display for a turn and bank indicator.

An example of how these pressure control devices 82 to 90 may be implemented is shown in the schematic of FIG. 7. A magnetic compass 92 has a shaft 94 which is fixed to the compass needle 95 and moved therewith and carries on the end thereof a cam 96. Cam 96 is positioned in the fluid path from nozzle 98 and therefore varies the fluid pressure in nozzle 98 as the cam is turned, moving closer or further away from nozzle 98, respectively increasing and decreasing the pressure in nozzle 98. Output line 100 from nozzle 98 could then be connected to a control input of an amplifier 24, 24a for an auxiliary control to the auto pilot shown in the schematic of FIG. 1. In like manner, other instruments could be implemented for use with this invention.

Although this invention has been disclosed and illustrated with reference to particular applications, the principles involved are susceptible of numerous other applications which will be apparent to persons skilled in the art. For example, the principles of this invention may be applied to machine controls as well as to vehicle controls. The invention is, therefore, to be limited only as indicated by the scope of the appended claims.

Having thus described my invention, I claim:

1. Apparatus comprising:
   first fluid rotational rate sensing means having an input flow to a chamber for fluid vortexes, and an output flow from the chamber for fluid vortexes,
   said rate sensing means receiving a supply flow at its input and discharging a flow at its output in proportion to the rotational rate being experienced by said rate sensing means due to the vortical flow in said rate sensing means caused by the rotational rate experienced by said rate sensing means,
   first biasing means for injecting a biasing vortical flow in one direction in said first fluid rate sensing means to cause said sensing means to operate during non rotation conditions at a predetermined point on the input-output curve of the sensing means so that rotational rates in one direction will cause the operating point to move in one direction on said input-output curve and rotational rates in the opposite direction will cause the operating point to move in the opposite direction on said input-output curve,
   second fluid rotational rate sensing means having an input flow to a chamber for fluid vortexes and an output flow from the chamber for fluid vortexes,
   said rate sensing means receiving a supply flow at its input and discharging a flow at its output in proportion to the rotational rate being experienced by said second rate sensing means due to the vortical flow caused in said second rate sensing means by the rotational rate experienced by said rate sensing means,
   second biasing means for injecting a biasing vortical flow in said second rate sensing means in a direction opposite to the direction of the vortical flow of said first biasing means and to cause said sensing means to operate during non rotation conditions at a predetermined point on the input-output curve of the sensing means so that rotational rates in one direction will cause the operating point to move in one direction on said input-output curve and rotational rates in the opposite direction will cause the operating point to move in the opposite direction on said input-output curve,
   common fluid supply means for providing supply pressure for said first and second fluid rotational rate sensing means.

2. The apparatus of claim 1 with
   fluid amplifier means for amplifying the outputs of each of said fluid rotational rate sensing means.

3. The apparatus of claim 1 with amplifier means for amplifying the outputs of each of said fluid rotational rate sensing means,
   said amplifier means being fluid vortex amplifiers.

4. The apparatus of claim 2 with
   means for supplying additional fluid inputs to said amplifier means and thereby modify the amplifier output signal.

5. The apparatus of claim 4 with
   vehicle control means,
   the output of one amplifier means being connected to move said control means in one direction and output of the other amplifier means being connected to move said control means in said one direction for the same rotational direction applied to said first and second rotational rate amplifiers.

6. The apparatus of claim 1 with
   each of said first and second rotational rate sensing means comprising a cylindrical chamber having a supply port means for admitting gaseous flow to said chamber,
   each of said first and second rotational rate sensing means having an exhaust port formed axially of the cylindrical chamber,
   biasing port means being placed circumferentially of each of said cylindrical chambers,
   an output pickoff tube spaced axially from each of said exhaust ports with a vacuum chamber being between each of said exhaust ports and an output pickoff tube,
   means to apply a pressure to each of said output pickoff tubes to cause a flow in said output pickoff tube which is counter to the flow in said exhaust ports,
   means to apply a reduced pressure to said vacuum chambers thereby causing a flow into said cylindrical chambers from said supply port means and said biasing port means,
   restriction means being in said supply port means so that the pressure in said biasing port means will be higher than that in said supply port means.

7. The apparatus of claim 6 with
   said means to apply a pressure to said output pickoff tubes comprising a connection to the center of the respective cylindrical chamber.

8. The apparatus of claim 6 with
   amplifying means connected to the outputs of each of said fluid rate sensing means,
   said amplifying means comprising cylindrical chambers having supply port means for supplying the amplifying means cylindrical chambers with a fluid flow,
   control port means arranged circumferentially of said amplifying means cylindrical chambers and connected to the outputs of said first and second rotational rate sensing means,
   said amplifying means having exhaust ports axially disposed of the amplifying means cylindrical chambers.

9. The apparatus of claim 8 with
   said amplifying means having pickoff tubes spaced axially of said exhaust ports with vacuum chambers therebetween,
   means to apply a reduced pressure to said vacuum chambers thereby causing a flow into said cylindrical chambers from said supply port means and said control port means,
   restriction means being in said supply port means so that the pressure in said biasing port means will be higher than that in said support port means.

10. The apparatus of claim 6 with
    porous means being in said fluid chamber of each of said first and second rate sensing means to more efficiently move the fluid in said rate sensing means when said rate sensing means are rotated.

11. Apparatus comprising
    first fluid means having an input flow to a chamber for fluid vortexes and an output flow from the chamber for fluid vortexes,
    said fluid means receiving a supply flow at its input and discharging a flow at its output in proportion to the vortical flow in said fluid means, first biasing means for injecting a biasing vortical flow in one direction in said first fluid means to cause said fluid means to operate during no signal conditions at a predetermined point on the input-output curve of the sensing means so that a vortical flow less than said no signal condition will cause the operating point to move in one direction on said input-output curve and a vortical flow greater than said no signal condition will cause the operating point to move in the opposite direction on said input-output curve, second fluid means having an input flow to a chamber for fluid vortexes and an output flow from the chamber for fluid vortexes, said fluid means receiving a supply flow at its input and discharging a flow at its output in proportion to the vortical flow in said second fluid means, second biasing means for injecting a biasing vortical flow in said second fluid means in a direction opposite to the direction of the vortical flow of said first fluid means and to cause said second fluid means to operate during no signal conditions at a predetermined point on the input-output curve of the second fluid means so that a vortical flow less than said no signal condition will cause the operating point to move in one direction on said input-output curve and a vortical flow greater than said no signal condition will cause the operating point to move in the opposite direction on said input-output curve, common fluid supply means for providing supply pressure for said first and second fluid means, signal means supplying substantially equal and opposite flows to said first and second fluid means so that when the biasing vortical flow in the first fluid means is aided, the biasing vortical flow in the second fluid means will be diminished, thereby making a pressure regulator unnecessary.

12. The apparatus of claim 11 with
vehicle control means,
the outputs of said first and second fluid means being connected to said vehicle control means.

13. In control apparatus for a craft having at least one axis about which rotation is to be sensed,
a pair of craft movement responsive fluid vortex rate sensors, each of which includes a vortex chamber having an axis and means in said chamber for imparting vortical flow to fluids therein in response to rotation thereof about said axis,
means for introducing supply fluid to said chambers from a common source at a predetermined supply pressure, and
means, separate from said means for introducing supply fluid, for introducing biasing fluid to each of said chambers at a predetermined pressure which is greater than said supply pressure to induce a biasing vortical flow of the fluid therein about the axis thereof in an opposite direction in one chamber from the flow in the other,
said rate sensors being mounted so that said vortex chamber axes are parallel for location in positions on said craft in which said chamber axes have components parallel to said craft axis so that movement of said craft about said axis causes additional vortical movement of the fluid in one of said chambers and reduced vortical movement of the fluid in the other one of said chambers whereby the difference in the output pressures from said sensors is related to the rate of rotation of said craft about said axis.

14. In control apparatus for a craft having at least one axis about which rotation is to be sensed,
a pair of craft movement responsive fluid vortex rate sensors, each of which includes a vortex chamber having an axis and means in said chamber for imparting vortical flow to fluids therein in response to rotation thereof about said axis,
means for introducing supply fluid to said chambers from a common source at a predetermined supply pressure,
means, separate from said means for introducing supply fluid, for introducing biasing fluid to each of said chambers at a predetermined pressure which is greater than said supply pressure to induce a biasing vortical flow of the fluid therein about the axis thereof in an opposite direction in one chamber from the flow in the other,
said rate sensors being mounted so that said vortex chambes axes are parallel for location in positions on said craft in which said chamber axes have components parallel to said craft axis so that movement of said craft about said axis causes additional vortical movement of the fluid in one of said chambers and reduced vortical movement of the fluid in the other one of said chambers whereby the difference in the output pressures from said sensors is related to the rate of rotation of said craft about said axis,
a fluid actuatable control device, and
means responsive to said output pressure difference and connected to said control device for actuating said control device in accordance with the magnitude of said difference.

15. Control apparatus according to claim 14 wherein said means connected to said control device includes a pair of fluid amplifiers each of which is operatively associated with one of said rate sensors.

16. Control apparatus according to claim 15 wherein said control device comprises a control arm and means forming bellows chambers disposed on opposite sides of said arm so that differential expansion of said chambers causes movement of said arm, and means connecting each of said bellows chambers to one of said fluid amplifiers.

References Cited

UNITED STATES PATENTS

| | | | |
|---|---|---|---|
| 1,141,631 | 6/1915 | Hayes | 73—214 |
| 3,216,439 | 11/1965 | Manion. | |
| 3,203,237 | 8/1965 | Ogren | 137—81.5 |
| 3,254,864 | 6/1966 | Kent et al. | 244—78 |
| 3,276,259 | 10/1966 | Bowles et al. | 73—196 X |
| 3,290,947 | 12/1966 | Reilly | 137—81.5 |
| 3,372,596 | 3/1968 | Keller | 73—505 |

OTHER REFERENCES

Control Engineering, September 1964, pp. 73, 76, 99 and 100.

ANDREW H. FARRELL, Primary Examiner

U.S. Cl. X.R.

137—81.5